US008611837B2

(12) United States Patent
Thorson et al.

(10) Patent No.: US 8,611,837 B2
(45) Date of Patent: Dec. 17, 2013

(54) METHOD AND APPARATUS FOR POWER CUTBACK IN A SIMULTANEOUS DUAL FREQUENCY BAND CALL

(75) Inventors: Dean E. Thorson, Grayslake, IL (US); Thomas D. Nagode, Vernon Hills, IL (US); Lawrence R. Schumacher, Hoffman Estates, IL (US)

(73) Assignee: Motorola Mobility LLC, Libertyville, IL (US)

( * ) Notice: Subject to any disclaimer, the term of this patent is extended or adjusted under 35 U.S.C. 154(b) by 315 days.

(21) Appl. No.: 13/221,430

(22) Filed: Aug. 30, 2011

(65) Prior Publication Data

US 2013/0053088 A1 Feb. 28, 2013

(51) Int. Cl.
*H04B 1/04* (2006.01)

(52) U.S. Cl.
USPC .......................... 455/127.4; 455/522; 455/69

(58) Field of Classification Search
USPC ............ 455/127.4, 552.1, 553.1, 522, 68, 69, 455/127.1, 426.1, 435.2; 370/331, 334
See application file for complete search history.

(56) References Cited

U.S. PATENT DOCUMENTS

| 5,257,283 | A * | 10/1993 | Gilhousen et al. ............ 455/522 |
| 5,564,076 | A * | 10/1996 | Auvray ..................... 455/76 |
| 7,477,108 | B2 | 1/2009 | Ichitsubo et al. |
| 7,702,295 | B1 | 4/2010 | Nicholls et al. |
| 2004/0002308 | A1 | 1/2004 | Eberle |
| 2004/0182936 | A1* | 9/2004 | Koenck et al. ........... 235/472.02 |
| 2004/0203557 | A1* | 10/2004 | Zhang .......................... 455/403 |
| 2004/0219948 | A1* | 11/2004 | Jones et al. ................. 455/552.1 |
| 2004/0266369 | A1 | 12/2004 | McCallister |
| 2006/0240789 | A1* | 10/2006 | Rosnell et al. ............. 455/127.4 |
| 2007/0254592 | A1 | 11/2007 | McCallister et al. |
| 2008/0043812 | A1 | 2/2008 | Moffatt |
| 2008/0043814 | A1 | 2/2008 | Moffatt |
| 2008/0043859 | A1 | 2/2008 | Moffatt |
| 2008/0043860 | A1 | 2/2008 | Moffatt |
| 2008/0043861 | A1 | 2/2008 | Moffatt |

(Continued)

FOREIGN PATENT DOCUMENTS

| EP | 1331743 A1 | 7/2003 |
| EP | 1596550 B1 | 3/2008 |

(Continued)

OTHER PUBLICATIONS

Sudhir Kumar Baghel et al: "Coexistence Possibilities of LTE with ISM Technologies and GNSS", National Conference on Communications NCC (2011), publisher: IEEE, all pages.

(Continued)

*Primary Examiner* — Dominic E Rego (57) ABSTRACT

A method and apparatus can cut back power in a simultaneous dual frequency band call. The method may operate a dual frequency band transmit device. The method may include determining if a transmit frequency in a first frequency band from the device combined with a transmit frequency in a second frequency band from the device causes receiver desensitization at the device. The method may include determining if the transmit power in the first frequency band is above a threshold power. The method may include reducing maximum transmit power in the second frequency band by an amount proportional to transmit power in the first frequency band and transmit signal bandwidth in the second frequency band in only the portion of the second frequency band where a resultant frequency component can cause desensitization.

22 Claims, 4 Drawing Sheets

(56) References Cited

U.S. PATENT DOCUMENTS

| | | |
|---|---|---|
| 2008/0049868 A1 | 2/2008 | Brobston |
| 2008/0095121 A1 | 4/2008 | Shattil |
| 2008/0130728 A1 | 6/2008 | Burgan et al. |
| 2009/0042596 A1 | 2/2009 | Yavuz et al. |
| 2009/0190633 A1 | 7/2009 | Smith |
| 2009/0274243 A1 | 11/2009 | Lee et al. |
| 2009/0313519 A1 | 12/2009 | Nagaraja |
| 2010/0056091 A1* | 3/2010 | Jang et al. ............ 455/226.1 |
| 2010/0090900 A1 | 4/2010 | Mitsumoto |
| 2010/0142448 A1 | 6/2010 | Schlicht et al. |
| 2010/0151808 A1 | 6/2010 | Toncich et al. |
| 2010/0189190 A1 | 7/2010 | Youtz et al. |
| 2010/0202416 A1 | 8/2010 | Wilhelmsson et al. |
| 2010/0207703 A1 | 8/2010 | Dupuy et al. |
| 2011/0261754 A1* | 10/2011 | Trainin ............... 370/328 |
| 2011/0300805 A1 | 12/2011 | Gaikwad et al. |
| 2011/0312288 A1 | 12/2011 | Fu et al. |
| 2011/0319085 A1* | 12/2011 | Ishii et al. ............ 455/436 |
| 2012/0003972 A1* | 1/2012 | Boixadera et al. ...... 455/426.1 |
| 2012/0113873 A1* | 5/2012 | Sanchez et al. ......... 370/277 |
| 2012/0182965 A1* | 7/2012 | Das et al. ............ 370/331 |

FOREIGN PATENT DOCUMENTS

| | | |
|---|---|---|
| WO | 2004109953 A1 | 12/2004 |
| WO | 2007096683 A1 | 8/2007 |
| WO | 2010045548 A1 | 4/2010 |
| WO | 2010124035 A1 | 10/2010 |

OTHER PUBLICATIONS

Dr. Jacques Gavan, "Radio System Interference Analysis and Computation Method for Two Co-sited Broadband Transceivers",1989, IEEE 1989 National Symposium on Electromagnetic Compatibility, May 23-25, 1989, pp. 426-430.

Alcatel-Lucent: "Harmonics and Intermodulation Products caused by LTE Advanced Carrier Aggregation of Band 2, 4 or 5 plus additional new 716-728 downlink", 3GPP Draft; R4-113984, 3rd Generation Partnership Project (3GPP), Mobile Competence Centre ; 650, Route Des Lucioles; F-06921 Sophia-Antipolis Cedex; France, vol. RAN WG4, No. Athens, Greece; Aug. 22, 2011, Aug. 17, 2011, all pages.

"3rd Generation Partnership Project; Technical Specification Group Radio Access Network; Evolved Universal Terrestrial Radio Access (E-UTRA); Study on signalling and procedure for interference avoidance for in-device coexistence (Release 11)", 3GPP Standard; 3GPP TR 36.816, 3rd Generation Partnership Project (3GPP), Mobile Competence Centre ; 650, Route Des Lucioles ; F-06921 Sophia-Antipolis Cedex; France, vol. RAN WG2, No. V11.0.0, Jun. 24, 2011, pp. 1-40.

Patent Cooperation Treaty, International Search Report and Written Opinion of the International Searching Authority for International Application No. PCT/US2012/052810, Oct. 9, 2012, 14 pages.

* cited by examiner

METHOD AND APPARATUS FOR POWER CUTBACK IN A SIMULTANEOUS DUAL FREQUENCY BAND CALL

BACKGROUND

1. Field

The present disclosure is directed to a method and apparatus for power cutback in a simultaneous dual frequency band call. More particularly, the present disclosure is directed to power cutback for a cellular call in a first frequency band simultaneous with a second frequency band.

2. Introduction

Wireless communication devices used in today's society include mobile phones, personal digital assistants, portable computers, gaming devices, and various other electronic communication devices. Such devices employ multiple transceivers that allow a device to transmit and receive signals on different wireless networks. For example, a device can include a Code Division Multiple Access (CDMA) transceiver, a Long Term Evolution (LTE) transceiver, a Universal Mobile Telecommunications System (UMTS) transceiver, a Global Positioning System (GPS) receiver, an 802.11-based transceiver, and/or other transceivers.

Unfortunately, nonlinearities in a device's radio frequency circuitry can cause receiver desensitization on certain channel combinations. For example, desensitization can occur when both the LTE and CDMA transmitters are on and are at or close to full power. This receiver desensitization can be a reduction in receiver sensitivity due to the presence of a high-level off-channel signal overloading the radio frequency amplifier or mixer stages. As a further example, receiver desensitization can occur when a strong off-channel signal overloads a receiver front end and thus reduces the sensitivity to weaker on-channel signals. One other example is when non-linearity in the transmitter circuitry can cause the transmit signals to mix, creating strong signals that fall within the device's receive frequency bands.

Hardware design has been implemented to minimize desensitization in a simultaneous dual frequency band call. However, with present technology, desensitization cannot be completely eliminated without degrading performance of the individual transceivers when they are operating alone.

Thus, there is a need for a method and apparatus for power cutback in a simultaneous dual frequency band call.

BRIEF DESCRIPTION OF THE DRAWINGS

In order to describe the manner in which advantages and features of the disclosure can be obtained, various embodiments will be illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

A method and apparatus for power cutback in a simultaneous dual frequency band call is disclosed. The method can operate on a dual frequency band transmit device. The method may include determining if a transmit frequency in a first frequency band from the device combined with a transmit frequency in a second frequency band from the device causes receiver desensitization at the device. The method may include determining if the transmit power in the first frequency band is above a threshold power. The method may include reducing maximum transmit power in the second frequency band by an amount proportional to transmit power in the first frequency band and transmit signal bandwidth in the second frequency band.

Figure 1:
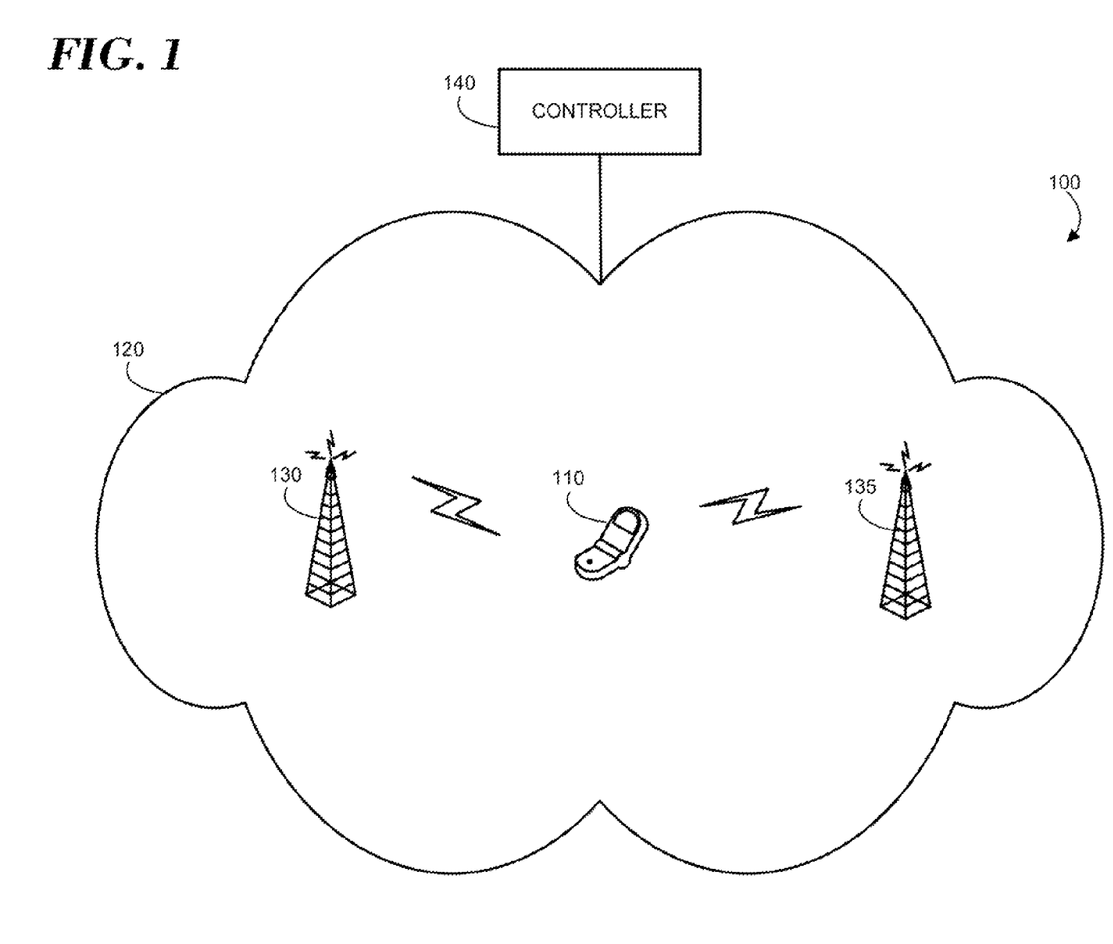
FIG. 1 illustrates an example diagram of a system in accordance with a possible embodiment.

FIG. 1 is an example block diagram of a system 100 according to one possible embodiment. The system 100 can include a terminal 110, a network 120, a first base station 130, a second base station 135, and a network controller 140.

The terminal 110 can be a wireless communication device including cellular and/or other wireless communication circuitry, such as Code Division Multiple Access (CDMA) circuitry, Long Term Evolution (LTE) circuitry, Universal Mobile Telecommunications System (UMTS) circuitry, Time Division Multiple Access (TDMA) circuitry, Frequency Division Multiple Access (FDMA) circuitry, Bluetooth circuitry, Wi-Fi circuitry, Global Positioning System (GPS) circuitry, and/or other wireless communication circuitry. For example, the terminal 110 can be a mobile phone, a personal digital assistant, a laptop computer, a tablet, or any other communication device that allows a user to communicate or perform applications using the terminal 110. As a further example, the terminal 110 can be a wireless communication device, such as navigation device, gaming device, entertainment device, a wireless telephone, a cellular telephone, a personal digital assistant, a pager, a selective call receiver, or any other device that is capable of sending and receiving communication signals on an electronic network The base stations 130 and 135 may be cellular base stations, a wireless local area network access points, or any other devices that provides access between a wireless device and a network. For example, the base station 130 can be a CDMA base station and the base station 135 can be a LTE or UMTS base station.

In an exemplary embodiment, the network controller 140 is connected to the network 120. The controller 140 may be located at a base station, at a radio network controller, or anywhere else on the network 120. The network 120 may include any type of network that is capable of sending and receiving signals, such as wireless signals. For example, the network 120 may include a wireless telecommunications network, a cellular telephone network, a CDMA network, a LTE network, a UMTS network, a TDMA network, an FDMA network, a satellite communications network, and other like communications systems. Furthermore, the network 110 may include more than one network and may include a plurality of different types of networks. Thus, the network 120 may include a plurality of data networks, a plurality of telecommunications networks, a combination of data and telecommunications networks and other like communication systems capable of sending and receiving communication signals.

In operation, the terminal 110 can determine if a transmit frequency in a first frequency band from the terminal 110 combined with a transmit frequency in a second frequency band from the terminal 110 causes receiver desensitization at the terminal 110. The terminal 110 can determine if the transmit power in the first frequency band is above a threshold power. The terminal 110 can reduce maximum transmit power in the second frequency band by an amount proportional to transmit power in the first frequency band and transmit signal bandwidth in the second frequency band.

For example, the first frequency band can be a CDMA frequency band or other frequency band. The second frequency band can be a LTE frequency band, a UMTS frequency band, or other frequency band. The maximum LTE output power can be cut back when certain channel combinations are encountered during a Simultaneous CDMA Voice/LTE Call (SVLTE). A method for cut back power can be performed using the following information: 1. The fact that the terminal 110 is in an SVLTE call; 2. The CDMA channel number; 3. LTE uplink Resource Block (RB) allocation, such as the number of RBs and RB location; 5. The CDMA output power, which can be calculated from open loop and/or closed loop power control; 6. Non-volatile memory location elements dictating the minimum CDMA power at which LTE cutback will start; and/or other useful information.

The calculation for LTE power cutback can be as fast as open loop power control because de-sensitization can otherwise occur in the receiver until the LTE power is cutback if the phone goes into a deep fade where CDMA power suddenly increases above the threshold.

LTE output power can be cut back starting at a given CDMA output power which can be dependent upon the phone design, such as dependent on front end losses, Surface Acoustic Wave (SAW) Duplex Filter Intercept Point3 (IP3), attenuation of LTE/CDMA Diplexer, antenna isolation for dual antenna configuration, and other information. Three non-volatile memory location elements can be used. Two elements can be used for the threshold CDMA output power at which LTE output power can be cut back to avoid either CDMA de-sensitization or LTE de-sensitization and one element can be used that gives the bandwidth, such as in tens of Khz, around the receive CDMA channel to be protected. Embodiments can scale the cutback according to the number of assigned uplink RBs. As more uplink RBs are assigned, the LTE output power can be spread, and consequently, LTE power may not have to be cut back as much.

According to some embodiments, the algorithm can disable the maximum power cutback for LTE de-sensitization and can ignore limitations created by Signal Absorption Radio (SAR) and antenna constraints, to allow for minimal implementation impact on the CDMA and LTE sub-systems.

The following terms can be used for the following example embodiment:

| | |
|---|---|
| LTE_PWR_RED_SVLTE: | The amount of power cutback that can be applied to the uplink LTE output power from max LTE output power. |
| P_MIN_CDMA_LTE: | The threshold CDMA output power that can give the desired LTE sensitivity at max LTE power during SVLTE. Any CDMA power higher than this may degrade LTE sensitivity. |
| P_MIN_CDMA_CDMA: | The threshold CDMA output power that can give the desired CDMA sensitivity at max LTE power during SVLTE. Any CDMA power higher than this may degrade CDMA sensitivity. |
| P_CDMA: | CDMA uplink output power that is currently being transmitted from the terminal. |
| NUM_OF_RB: | Number of uplink RBs to be transmitted. |
| CHANNEL_NUMBER: | CDMA Channel Number. |
| INT_BW: | Bandwidth of the interferer (in tens of KHz). Default can be 264, which is equivalent to 2,640,000 Hz. |
| RB_NUM_LOW: | The lowest RB number for a given CDMA channel, CHANNEL_NUMBER, which might require LTE power cutback. |
| RB_NUM_HIGH: | The highest RB number for a given CDMA channel, CHANNEL_NUMBER, which might require LTE power cutback. |

According to some embodiments, the following procedure can be implemented at a terminal MODEM:

1. Procedures for CDMA Side.
  a. When any of the following messages are received, compare the CHANNEL_NUMBER contained in the message to the current operating channel. If different, then send a message from the CDMA sub-system to the LTE sub-system containing the new CHANNEL_NUMBER and the P_MIN_CDMA_CDMA information. The new CHANNEL_NUMBER can be the CHANNEL_NUMBER contained in the message. For example, the message can contain an updated channel number, if it has changed. According to some examples, the message may always contain the active CDMA channel number, because it can be simpler to always include that data.
    i. Channel Assignment Message
    ii. Extended Channel Assignment Message
    iii. Handoff Direction Message
    iv. Extended Handoff Direction Message
    v. Global Handoff Direction Message
  b. When transmitting above P_MIN_CDMA_CDMA in Band Class 0 and when
    $1 \leq$ CHANNEL_NUMBER $\leq 313$ or
    $991 \leq$ CHANNEL_NUMBER $\leq 1023$,
  set the General Purpose Input Output X1 (GPIOX1) to inform the LTE sub-system that a potential interference problem exists. The channel numbers can correspond to frequencies where a previous calculation has determined interference can exist if the LTE system is transmitting the wrong resource blocks. The state of GPIOX1 shall be held until the modem stops transmitting for any of the reasons noted below.
    i. The CDMA sub-system sends a Release Order to the network.
    ii. The CDMA sub-system receives a Release Order from the network.
    iii. The call is dropped through signal loss from the network.
  c. When GPIOX1 is set, the CDMA sub-system can send the measured transmit power (P_CDMA) to the LTE sub-system once every 5 milliseconds over the UART connecting the two modems. For example, that the power control groups in CDMA can operate on 1.25 millisecond boundaries, while those in LTE can operate on 1 millisecond boundaries. The choice of 5 milliseconds can allow the two sub-systems to adjust their power on fixed boundaries. This can induce a possible error of 4 power control adjustments on the CDMA side and 5 on the LTE side.
    i. The data can be transmitted in signed integer format (8 bit field) that ranges from +127 to −128 dBm, with valid powers within the range +30 to −64 dBm.
2. Procedures for LTE Side
  a. When the CHANNEL_NUMBER and PMIN_CDMA_CDMA information message is received from the CDMA sub-system, the LTE sub-system can calculate the resource block limitations (RB_NUM_LOW and RB_NUM_HIGH) based upon the formula below.
    i. IF $1 < N \leq 799$ (where N=the operational CDMA channel) RB_NUM_LOW =INT[(3*CHANNEL_NUMBER−INT_BW+241)/18]

RB_NUM HIGH=INT[(3*CHANNEL_NUMBER+ INT_BW+241)/18]

ii. ELSEIF 991≤N≤1023

RB_NUM_LOW=INT[(3*CHANNEL_NUMBER− INT_BW−2828)/18]

RB_NUM HIGH=INT[(3*CHANNEL_NUMBER+ INT_BW−2828)/18]

where INT_BW=264, which corresponds to a 2.64 MHz interference bandwidth.

b. When GPIOX1 is set, the LTE sub-system can receive the measured CDMA transmit power, P_CDMA, from the CDMA sub-system over the Universal Asynchronous Receiver/Transmitter (UART) connection.

i. If any resource blocks fall within the range RB_NUM_LOW≤RB≤RB_NUM_HIGH, then the LTE sub-system can calculate the power cutback for bearer resource blocks per the following formula:

LTE_PWR_RED_SVLTE_CDMA=2*(P_CDMA− P_MIN_CDMA_CDMA)−10*log(NUM_OF_RB)

According to one example, this formula can be determined based on the fact that the interference can be third order and proportional to twice the CDMA transmit power and proportional to 1× the LTE transmit power. Furthermore, the power can be proportional to the LTE operating bandwidth, which can be defined by the number of active resource blocks. Note that if any resource blocks fall within the interference range, then the power reduction calculation can be based upon the number of resource blocks (NUM_OF_RB) that fall within the RB_NUM_LOW≤RB≤RB_NUM_HIGH limits.

ii. The LTE sub-system can reduce the maximum transmit power of the resource blocks that fall within the interference range (RB_NUM_LOW≤RB≤RB_NUM_HIGH) per the following constraints.

1. Resource blocks that contain signaling may not have their maximum transmit power reduced.

2. Resource blocks that do not contain signaling may have their maximum transmit power reduced by LTE_PWR_RED_SVLTE_CDMA. Note that the power reduction limitation can be with respect to the maximum transmit power of the device and not necessarily the dynamic transmit power of the LTE sub-system. The overall effect of the reduction in many cases may result in no change in the LTE transmit power, as this can change the maximum power limit.

As an example for Conversion of Channel Number to Frequency for Band Class 0, if the terminal CDMA channel number is 1≤N≤799, the CDMA center frequency can be 0.030 N+825.000 MHz. If the terminal CDMA channel number is 991≤N≤1023, the CDMA center frequency can be 0.030 (N−1023)+825.000 MHz. If the base station CDMA channel number is 1≤N≤799, the CDMA center frequency can be 0.030 N+870.000 MHz. If the base station CDMA channel number is 991≤N≤1023, the CDMA center frequency can be 0.030 (N−1023)+870.000 MHz.

As an example for Conversion of Resource Block Number to Frequency for Band 13, if the terminal LTE Resource Block (RB) number is 1≤RBt≤50, that LTE Resource Block center frequency can be 0.18 RBt+777.590 MHz. If the base station LTE Resource Block (RB) number is 1≤RBr≤50, that LTE Resource Block center frequency can be 0.18 RBr+746 MHz.

Figure 2:
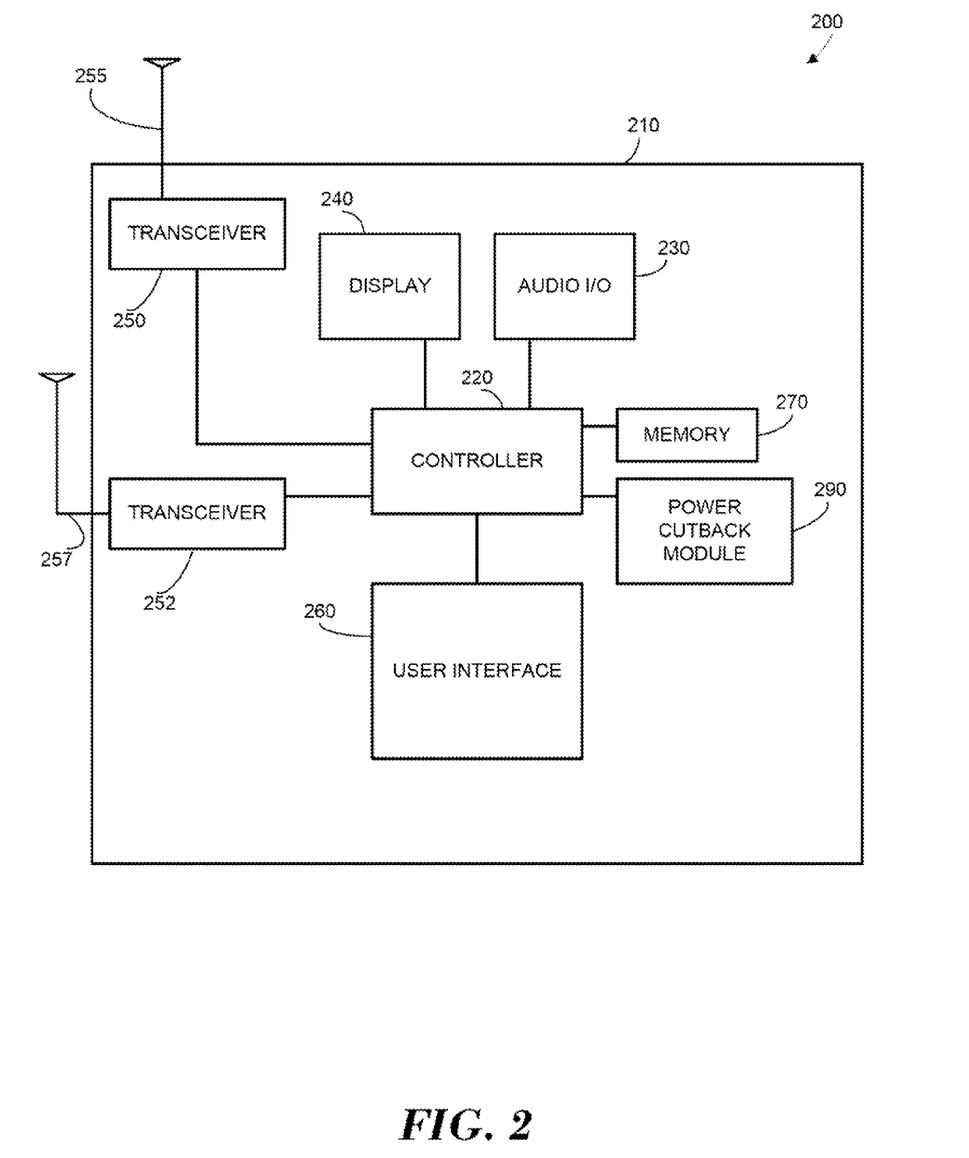
FIG. 2 illustrates an example block diagram of an apparatus in accordance with a possible embodiment.

FIG. 2 is an example block diagram of a wireless communication device 200, such as the terminal 110, according to a possible embodiment. The wireless communication device 200 can include a housing 210, a controller 220 located within the housing 210, audio input and output circuitry 230 coupled to the controller 220, a display 240 coupled to the controller 220, a first transceiver 250 coupled to the controller 220, a first antenna 255 coupled to the first transceiver 250, a second transceiver 252 coupled to the controller 220, a second antenna 257 coupled to the second transceiver 252, a user interface 260 coupled to the controller 220, and a memory 270 coupled to the controller 220. The wireless communication device 200 can also include a power cutback module 290. The power cutback module 290 can be coupled to the controller 220, can reside within the controller 220, can reside within the memory 270, can be an autonomous module, can be software, can be hardware, or can be in any other format useful for a module for a wireless communication device 200.

The display 240 can be a liquid crystal display (LCD), a light emitting diode (LED) display, a plasma display, a touch screen display, a projector, or any other means for displaying information. Other methods can be used to present information to a user, such as aurally through a speaker or kinesthetically through a vibrator. The transceivers 250 and/or 252 may include transmitters and/or receivers. The audio input and output circuitry 230 can include a microphone, a speaker, a transducer, or any other audio input and output circuitry. The user interface 260 can include a keypad, buttons, a touch pad, a joystick, an additional display, a touch screen display, or any other device useful for providing an interface between a user and an electronic device. The memory 270 can include a random access memory, a read only memory, an optical memory, a subscriber identity module memory, flash memory, or any other memory that can be coupled to a wireless communication device.

In operation, the first transceiver 250 can transmit in a first frequency band. The second transceiver 252 can transmit in a second frequency band. The controller 220 can control operations of the wireless communication device 200. The power cutback module 290 can determine if a transmit frequency in the first frequency band combined with a transmit frequency in the second frequency band causes receiver desensitization. The power cutback module 290 can determine if the transmit power in the first frequency band is above a threshold power. The power cutback module 290 can reduce the maximum transmit power in the second frequency band by an amount proportional to transmit power in the first frequency band and transmit signal bandwidth in the second frequency band if the transmit frequency in the first frequency band combined with the transmit frequency in the second frequency band causes receiver desensitization at the device 200 and if the transmit power in the first frequency band is above the threshold power.

The power cutback module 290 may reduce the maximum transmit power in the second frequency band in only the portion of the second frequency band where a resultant frequency component can cause desensitization. The power cutback module 290 may also reduce the maximum transmit power in the second frequency band in only the portion of the second frequency band where a resultant frequency component can cause desensitization in the sub-portion of that second frequency band that does not contain signaling. The power cutback module 290 can reduce the maximum power in the second frequency band based on a formula including:

two multiplied by (first frequency band transmit power minus a threshold) minus (an amount inversely proportional to the bandwidth of transmit bandwidth in the second frequency band). For example, the power cutback module can reduce the maximum power in the second frequency band based on a formula including: $2*(Tx_1-Th)-(1/BW_2)$, where $Tx_1$ comprises a first frequency band transmit power, where Th comprises a threshold for the first frequency band transmit power, and where $1/BW_2$ comprises an amount inversely proportional to the bandwidth of transmit bandwidth in the second frequency band. The power cutback module 290 can calculate an interfering bandwidth between the first frequency band and the second frequency band and can reduce the maximum transmit power in the second frequency band based on the calculated interfering bandwidth. For example, the power adjustment can depend upon the calculated interfering bandwidth, the part of a LTE waveform that creates interference can be calculated, and then the power can be adjusted appropriately for that bandwidth. The interference calculation can be performed on the active portion of the LTE waveform and a determination can be made that no real interference exists if the active portion, such as the portion including allocated resource blocks, does not actually create interference. The transmit power in the second frequency band can be inversely proportional to a number transmitted of resource blocks.

The controller 220 can operate the wireless communication device 200 in a simultaneous call in the first frequency band and in the second frequency band. The power cutback module 290 can determine receiver sensitization while operating the device 200 in a simultaneous call in the first frequency band and in the second frequency band. The first frequency band can be a CDMA radio frequency band and the second frequency band can be LTE radio frequency band. The power cutback module 290 can determine if the transmit frequency in the first frequency band from the device 200 combined with a simultaneous transmit frequency in the second frequency band from the device 200 causes receiver desensitization at the device 200.

Figure 3:
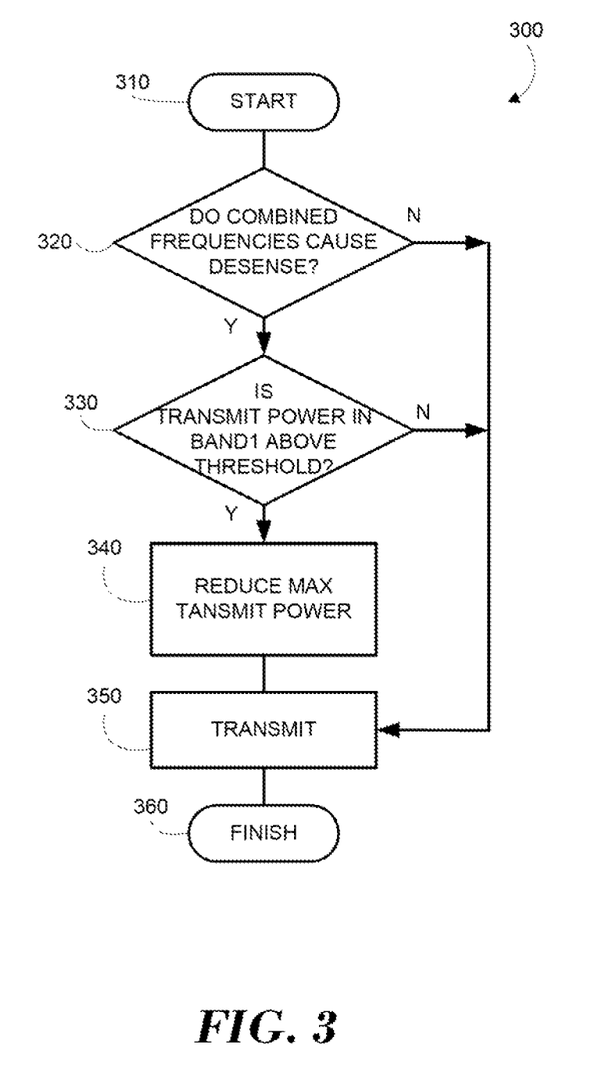
FIG. 3 shows a sample flowchart illustrating the operation of the apparatus of FIG. 2 in accordance with a possible embodiment.

FIG. 3 illustrates an example flowchart 300 illustrating the operation of the wireless communication device 200 according to one possible embodiment. For example, the flowchart 300 can illustrate a method of operating a dual frequency band transmit device. As a further example, the method can be performed in a LTE modem at a baseband level before transmission. The method can reduce transmit power in a frequency band by an amount proportional to transmit signal bandwidth. At 310, the flowchart can begin.

At 320, a determination can be made whether a transmit frequency in a first frequency band from the device combined with a transmit frequency in a second frequency band from the device causes receiver desensitization at the device. According to one embodiment, the first frequency band can be a CDMA radio frequency band and the second frequency band can be a LTE radio frequency band. The frequency bands can be other cellular wireless technology frequency bands. For example, the second frequency band can be a UMTS frequency band. Receiver desensitization can be a reduction in receiver sensitivity due to the presence of a high-level off-channel signal overloading the radio-frequency amplifier or mixer stages. For example, receiver desensitization can occur when a strong off-channel signal overloads a receiver front end and thus reduces the sensitivity to weaker on-channel signals. For example, receiver desensitization can occur when two off-channel signals combine in a non-linear device to create an on-channel signal that reduces the receiver front end's sensitivity to on-channel signals.

Determining receiver desensitization can include determining if transmitting at the transmit frequency in the first frequency band from the device combined with simultaneous transmitting at the transmit frequency in the second frequency band from the device causes receiver desensitization at the device.

If the combination of transmit frequencies causes receiver desensitization, at 330, a determination can be made whether transmit power in the first frequency band is above a threshold power. At 340, if transmit power in the first frequency band is above the threshold power, a maximum transmit power can be reduced in the second frequency band by an amount proportional to transmit power in the first frequency band and transmit signal bandwidth in the second frequency band. Reducing can include reducing the maximum transmit power in the second frequency band in only the portion of the second frequency band where a resultant frequency component can cause desensitization. Reducing can include reducing the maximum transmit power in the second frequency band in only the portion of the second frequency band where a resultant frequency component can cause desensitization and signaling is not being transmitted. Reducing can include reducing the maximum power in the second frequency band based on a formula including: $2*$(first frequency band transmit power–threshold)–(an amount inversely proportional to the bandwidth of transmit bandwidth in the second frequency band). The transmit power in the second frequency band can be inversely proportional to a number of transmitted resource blocks. At 350, the device can transmit a call in the second frequency band simultaneous with reduced maximum transmit power and in the first frequency band.

At 350, the flowchart 300 can end. According to some embodiments, all of the blocks of the flowchart 300 may not be necessary. Additionally, the flowchart 300 or blocks of the flowchart 300 may be performed numerous times, such as iteratively. For example, the flowchart 300 may loop back from later blocks to earlier blocks.

Furthermore, many of the blocks can be performed concurrently or in parallel processes.

Figure 4:
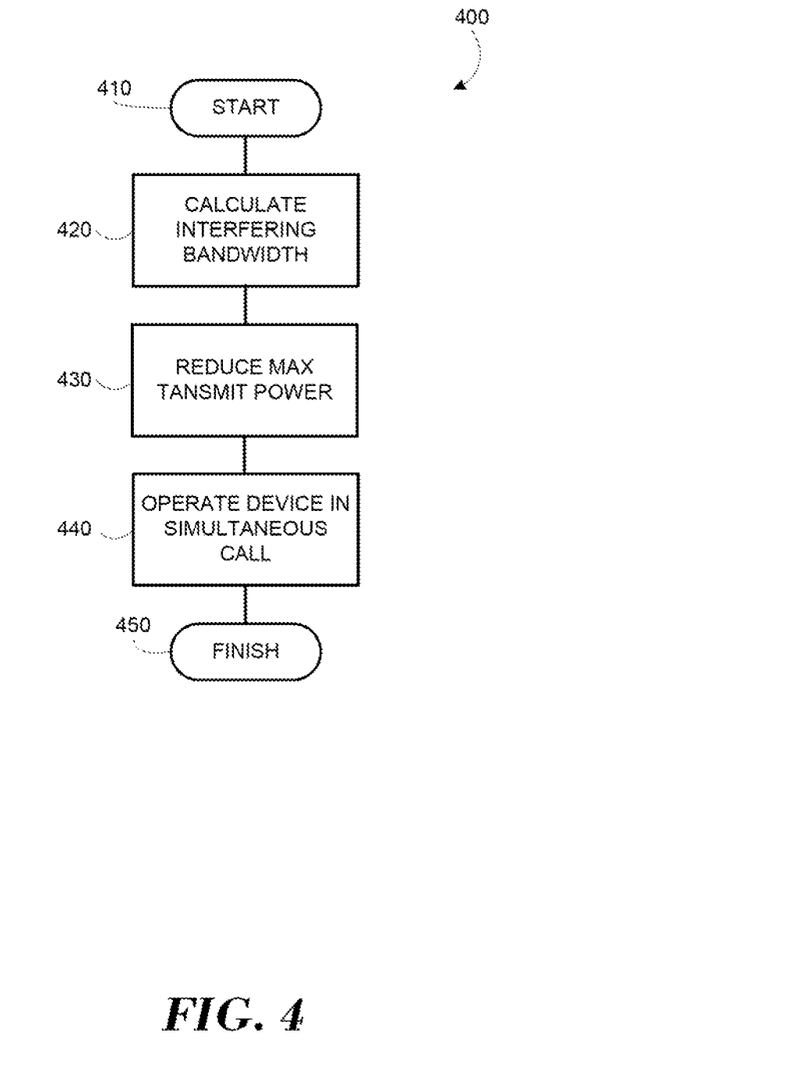
FIG. 4 shows a sample flowchart illustrating the operation of the apparatus of FIG. 2 in accordance with a possible embodiment.

FIG. 4 illustrates an example flowchart 400 illustrating the operation of the wireless communication device 200 according to one possible embodiment. At 410, the flowchart 400 begins. At 420, an interfering bandwidth between a first frequency band and a second frequency band can be calculated.

At 430, the maximum transmit power in the second frequency band can be reduced based on the calculated interfering bandwidth. For example, the power adjustment can depend upon the calculated interfering bandwidth. The part of the LTE waveform that creates interference can be calculated, and then the power can be adjusted appropriately for that bandwidth. The interference calculation can be performed on the active portion of the LTE waveform and a determination can be made that no real interference exists if the active portion, such as the portion including allocated resource blocks, does not actually create interference.

At 440, the device can operate in a simultaneous call in the first frequency band and in the second frequency band. For example, the first frequency band can be transmitted using a first frequency band transmitter and the second frequency band can be transmitted using a second frequency band transmitter. Determining receiver sensitization can be performed before operating the device in a simultaneous call in the first frequency band and in the second frequency band and/or can be performed while or after operating the device in a simultaneous call in the first frequency band and in the second frequency band.

Elements of the flowchart 400 can be combined with elements of the flowchart 300. For example, elements of the flowchart 400 can be added to the flowchart 300 as described in earlier embodiments. According to some embodiments, all of the blocks of the flowchart 400 may not be necessary. Additionally, the flowchart 400 or blocks of the flowchart 400 may be performed numerous times, such as iteratively. For example, the flowchart 400 may loop back from later blocks to earlier blocks. Furthermore, many of the blocks can be performed concurrently or in parallel processes.

The methods of this disclosure may be implemented on a programmed processor. However, the operations of the embodiments may also be implemented on non-transitory machine readable storage having stored thereon a computer program having a plurality of code sections that include the blocks illustrated in the flowcharts, or a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method of operating a dual frequency band transmit device, the method comprising:
   determining if a transmit frequency in a first frequency band from the device combined with a transmit frequency in a second frequency band from the device causes receiver desensitization at the device;
   determining if transmit power in the first frequency band is above a threshold power; and
   reducing maximum transmit power in the second frequency band by an amount proportional to transmit power in the first frequency band and transmit signal bandwidth in the second frequency band if the transmit frequency in the first frequency band combined with the transmit frequency in the second frequency band causes receiver desensitization at the device and if the transmit power in the first frequency band is above the threshold power.

2. The method according to claim 1, wherein reducing comprises reducing the maximum transmit power in the second frequency band in only the portion of the second frequency band where a resultant frequency component can cause desensitization.

3. The method according to claim 1, wherein reducing comprises changing the maximum transmit power in the second frequency band in a sub-portion of the second frequency band where a resultant frequency component can cause desensitization if that sub-portion is not transmitting signaling information.

4. The method according to claim 1, wherein reducing comprises reducing the maximum power in the second frequency band based on a formula including:
2*(first frequency band transmit power−threshold)−(an amount inversely proportional to the bandwidth of transmit bandwidth in the second frequency band).

5. The method according to claim 1, further comprising calculating an interfering bandwidth between the first frequency band and the second frequency band,
   wherein the maximum transmit power in the second frequency band is reduced based on the calculated interfering bandwidth.

6. The method according to claim 1, wherein the transmit power in the second frequency band is inversely proportional to a number of transmitted resource blocks.

7. The method according to claim 1, further comprising operating the transmit device in a simultaneous call in the first frequency band and in the second frequency band,
   wherein determining receiver sensitization is performed while operating the transmit device in a simultaneous call in the first frequency band and in the second frequency band.

8. The method according to claim 1, further comprising:
   transmitting the first frequency band using a first frequency band transmitter; and
   transmitting the second frequency band using a second frequency band transmitter.

9. The method according to claim 1, wherein the first frequency band comprises a code division multiple access radio frequency band and wherein the second frequency band comprises a long term evolution radio frequency band.

10. The method according to claim 1, wherein determining receiver desensitization comprises determining if transmitting at the transmit frequency in the first frequency band from the device combined with simultaneous transmitting at the transmit frequency in the second frequency band from the device causes receiver desensitization at the device.

11. An apparatus comprising:
a first transceiver configured to transmit in a first frequency band;
a second transceiver configured to transmit in a second frequency band;
a controller coupled to the first transceiver and the second transceiver, the controller configured to control operations of the apparatus;
a power cutback module coupled to the controller, the power cutback module configured to determine if a transmit frequency in the first frequency band combined with a transmit frequency in the second frequency band causes receiver desensitization, configured to determine if transmit power in the first frequency band is above a threshold power, and configured to reduce the maximum transmit power in the second frequency band by an amount proportional to transmit power in the first frequency band and transmit signal bandwidth in the second frequency band if the transmit frequency in the first frequency band combined with the transmit frequency in the second frequency band causes receiver desensitization at the device and if the transmit power in the first frequency band is above the threshold power.

12. The apparatus according to claim 11, wherein the power cutback module is configured to reduce the maximum transmit power in the second frequency band in only the portion of the second frequency band where a resultant frequency component can cause desensitization.

13. The apparatus according to claim 11, wherein the power cutback module is configured to reduce the maximum transmit power in the second frequency band in a sub-portion of the second frequency band where a resultant frequency component can cause desensitization if that sub-portion is not transmitting signaling information.

14. The apparatus according to claim 11, wherein the power cutback module is configured to reduce the maximum power in the second frequency band based on a formula including: $2*(Tx_1-Th)-(1/BW_2)$,
where $Tx_1$ comprises a first frequency band transmit power,
where Th comprises a threshold for the first frequency band transmit power, and
where $1/BW_2$ comprises an amount inversely proportional to the bandwidth of transmit bandwidth in the second frequency band.

15. The apparatus according to claim 11, the power cutback module is configured to calculate an interfering bandwidth between the first frequency band and the second frequency band and configured to reduce the maximum transmit power in the second frequency band based on the calculated interfering bandwidth.

16. The apparatus according to claim 11, wherein the transmit power in the second frequency band is inversely proportional to a number transmitted of resource blocks.

17. The apparatus according to claim 11,
wherein the controller is configured to operating the transmit device in a simultaneous call in the first frequency band and in the second frequency band, and
wherein the power cutback module is configured to determine receiver sensitization while operating the transmit device in a simultaneous call in the first frequency band and in the second frequency band.

18. The apparatus according to claim 11, wherein the first frequency band comprises a code division multiple access radio frequency band and wherein the second frequency band comprises a long term evolution radio frequency band.

19. The apparatus according to claim 11, wherein the power cutback module is configured to determine if the transmit frequency in the first frequency band from the device combined with a simultaneous transmit frequency in the second frequency band from the device causes receiver desensitization at the device.

20. An apparatus comprising:
a first transceiver configured to transmit in a first frequency band at a transmit power;
a second transceiver configured to transmit in a second frequency band;
a controller coupled to the first transceiver and the second transceiver, the controller configured to control operations of the apparatus;
a user interface coupled to the controller, the user input configured to receive input from a user;
a power cutback module coupled to the controller, the power cutback module configured to determine if a transmit frequency in the first frequency band combined with a transmit frequency in the second frequency band causes receiver desensitization, configured to determine if the transmit power in the first frequency band is above a threshold power, and configured to reduce maximum transmit power in the second frequency band by an amount proportional to transmit power in the first frequency band and transmit signal bandwidth in the second frequency band if the transmit frequency in the first frequency band combined with the transmit frequency in the second frequency band causes receiver desensitization at the device and if the transmit power in the first frequency band is above the threshold power,
wherein desensitization comprises reduced receiver sensitivity from a strong off-channel signal overloading a receiver front end and reducing the sensitivity to weaker on-channel signals.

21. The apparatus according to claim 20, wherein the power cutback module is configured to reduce the maximum transmit power in the second frequency band in only the portion of the second frequency band where a resultant frequency component causes desensitization.

22. The apparatus according to claim 20, wherein the power cutback module is configured to calculate an interfering bandwidth between the first frequency band and the second frequency band and configured to reduce the maximum transmit power in the second frequency band based on the calculated interfering bandwidth.

* * * * *